(12) United States Patent
Martin et al.

(10) Patent No.: US 7,162,894 B2
(45) Date of Patent: Jan. 16, 2007

(54) METHOD FOR CHARGING QUARTZ GLASS OBJECTS WITH HYDROGEN

(75) Inventors: Rolf Martin, Jena (DE); Gordon Von Der Goenna, Jena (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 10/232,541

(22) Filed: Aug. 30, 2002

(65) Prior Publication Data
US 2003/0172679 A1  Sep. 18, 2003

(30) Foreign Application Priority Data
Aug. 30, 2001  (DE) ................................ 101 42 861

(51) Int. Cl.
C03B 25/00 (2006.01)
G02B 6/00 (2006.01)
(52) U.S. Cl. ........................ 65/117; 65/29.12; 65/30.1; 65/399
(58) Field of Classification Search .................. 65/112, 65/117, 29.12, 30.1, 377, 378, 426, 399, 424, 65/900
See application file for complete search history.

(56) References Cited

U.S. PATENT DOCUMENTS

| | | | | |
|---|---|---|---|---|
| 5,086,352 A | * | 2/1992 | Yamagata et al. | 359/350 |
| 5,325,230 A | * | 6/1994 | Yamagata et al. | 359/350 |
| 5,364,433 A | * | 11/1994 | Nishimura et al. | 65/17.4 |
| 6,143,676 A | | 11/2000 | Ohashi et al. | |
| 6,672,109 B1 | * | 1/2004 | Hiraiwa | 65/378 |
| 2002/0038557 A1 | * | 4/2002 | Matsuo et al. | 65/17.4 |
| 2003/0066309 A1 | * | 4/2003 | Ueda et al. | 65/30.1 |
| 2003/0115905 A1 | * | 6/2003 | Kuhn et al. | 65/17.6 |
| 2003/0119649 A1 | * | 6/2003 | Jinbo et al. | 501/53 |
| 2003/0138587 A1 | * | 7/2003 | Otsuka et al. | 428/64.1 |

FOREIGN PATENT DOCUMENTS

| | | |
|---|---|---|
| EP | 0 401 845 | 12/1990 |
| EP | 0483752 | 5/1992 |
| EP | 1 033 350 | 9/2000 |
| EP | 1 061 052 | 12/2000 |
| EP | 1 233 005 | 8/2002 |
| WO | 00/39038 | 7/2000 |

* cited by examiner

Primary Examiner—Steven P. Griffin
Assistant Examiner—Carlos Lopez
(74) Attorney, Agent, or Firm—Jordan and Hamburg LLP

(57) ABSTRACT

The invention relates to the loading of quartz glass objects with hydrogen in an annealing process in a furnace for improving the homogeneity of the refractive index and the laser resistance while, at the same time, maintaining a specified stress birefringence of each of the glass objects. Initially, the distribution of the refractive index, the stress birefringence, the distribution of the hydrogen and the differences in refractive index, which are to be equalized, are determined in the respective glass object, after which the hydrogen change, which is necessary for equalizing the refractive index, is determined. Furthermore, the annealing temperature and its holding time, as well as the hydrogen concentration and the hydrogen pressure in the furnace are adjusted to achieve a sufficiently equalized distribution of refractive index.

12 Claims, 1 Drawing Sheet

METHOD FOR CHARGING QUARTZ GLASS OBJECTS WITH HYDROGEN

Figure 1:
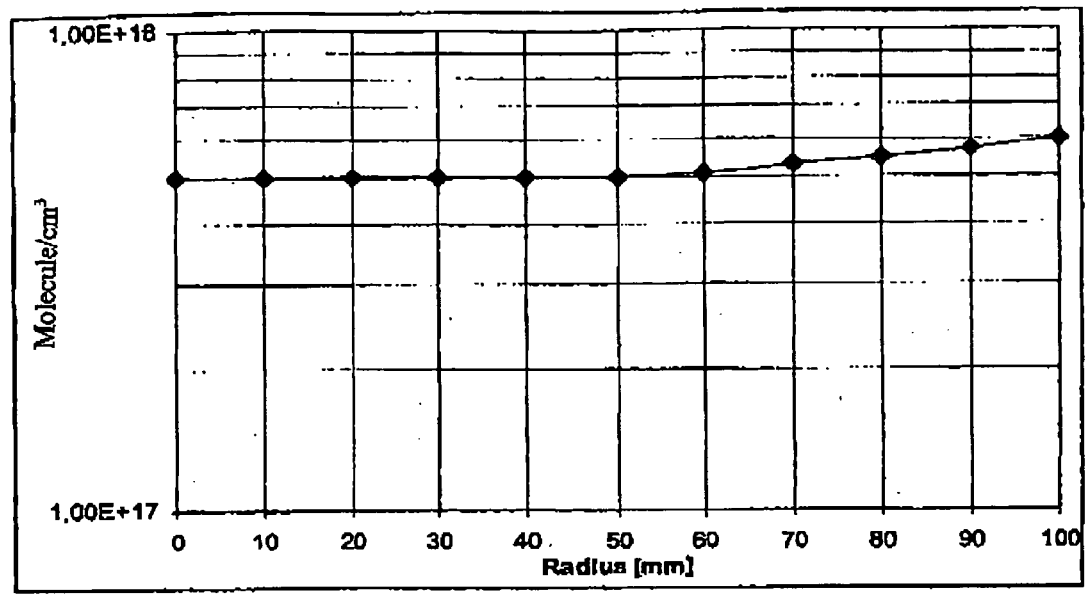

The present invention relates to a method for loading quartz glass objects with hydrogen for improving the homogeneity of the refractive index and the laser resistance while, at the same time, maintaining a specified stress birefringence, and to quartz glass objects produced thereby. The quartz glass used is a homogeneous, synthetic quartz glass, which is employed in optical systems for microlithography. This quartz glass is supplied by manufacturers of glass to manufacturers of lenses as blanks, generally in the form of circular disks. The shape of the quartz glass may, however, also be angular in plan view and have a height, which preferably is less than the length of the sides or the diameter in plan view. In order to be able to produce lenses for optical systems of microlithography from the blanks, certain predetermined specifications must be fulfilled. Moreover, the permissible fluctuations in the values of the properties of the material selected must be established for this blank. Blanks, which are so specified, are a prerequisite for the production of lenses of specified imaging quality. These blanks must fulfill the following important requirements:

- a constant local refractive index (high homogeneity of the refractive index),
- a low and locally uniform stress birefringence (SDB),
- a high temporal consistency of all optical properties during the transmission of the laser light through the blanks, especially at the wavelengths of 193 nm (ArF laser) and 248 nm (KrF laser). The lowest possible laser-induced absorption (LIA) that is, the increase in the absorption of laser light energy during prolonged laser irradiation, plays an important role here.

A high refractive index homogeneity in any blank presupposes a locally (partially) constant chemical composition and a constant glass structure. Important factors, which have an effect on the homogeneity of the refractive index, are disorders in the chemical composition due to local fluctuations in the content of molecular hydrogen ($H_2$), which is in the structural interstices and essentially is not bound into the glass structure, and a locally fluctuating content of Si—OH, as an incorporated structural defect. Blessed defects lead to local fluctuations in the refractive index during the passage of a light wave through the blank.

A low and locally uniform stress birefringence is achieved if, due to a good stress relief (cooling) and a uniform distribution of the chemical composition and of the structural defects, mechanical stresses are, as far as possible, no longer present in the cooled blank. The mechanical stresses, still present, not only bring about stress birefringence, but also affect the homogeneity of the refractive index over photoelastic constants.

A low LIA presupposes that, during the whole of the period use of the lens, manufactured from the blank, in the optical system, the concentration of absorbing defects remains slight. According to the physical models, which are valid at the present time, the number of these absorbing defects depends on the number of so-called precursor defects and on the number of the hydrogen molecules present in the glass. Precursor defects may be disorders in the ideal $SiO_2$ network, such as broken or stressed Si—O bonds. During laser irradiation, the precursor defects are converted into absorbing defects. Moreover, during laser irradiation, there is an equilibrium in the quartz glass between the formation of absorbing defects and their conversion into non-absorbing defects by the addition reaction of hydrogen. The ratio of precursor defects to molecular hydrogen thus determines the LIA of the quartz glass. If the resistance to the laser is to be adequate (low LIA), there must be a minimum amount of molecular hydrogen in the quartz class during the whole of the period of use of the lens produced from the blank To summarize, it may be stated that, for a blank of synthetic quartz glass with a refractive index of high homogeneity, a low SDB and a low LIA, a locally very well balanced Si—OH content and an also locally very well balanced content of molecular hydrogen at a minimum level are necessary.

Synthetic quartz glass is produced in a hydrogen flame by the oxidation of $SiCl_4$ to $SiO_2$ during a flame pyrolysis method. At the same time,

- precursor defects, which are converted during laser irradiation into absorbing defects,
- local Si—OH fluctuations
- local fluctuations in the molecular hydrogen are necessarily formed in the quartz glass.

It is not always possible technically and economically to control the melting process say that, after the melting and annealing, blanks can be produced, which fulfill the specifications for use in lithography. The average content and the local distribution of Si—OH can be adjusted approximately in the melt. On the other hand, it is not possible to achieve a minimum content of hydrogen and an adequately balanced variation of hydrogen over the whole diameter of the roller. The situation is complicated by the fact that, already during the melting and annealing of the quartz glass roller (cooling), the hydrogen concentration is reduced by diffusion and the local distribution is changed.

According to the state of the art, large disks, which contain small regions of adequate quality, are melted and annealed according to a known method. These regions are determined by examining the starting disks and then produced from this large disk. The required blanks are then produced from these regions. A distinguishing feature of this method is a hydrogen content ranging from $1 \times 10^{17}$ to $5 \times 10^{17}$ molecules/cc. In a different method, the molten rollers are heated in a subsequent step of the process so that they can be deformed mechanically. The roller is homogenized by shear movements in different directions, so that blanks, which have the required quality, can be removed from it. The hydrogen content of the roller is reduced clearly once again during homogenization and annealing. A distinguishing feature of this method is a hydrogen content ranging from $1 \times 10^{15}$ to $1 \times 10^{16}$ molecules/cc. A material with a relatively low hydrogen content is thus produced by both methods. During the subsequent homogenization, the danger of a high LIA exists, especially owing to the fact that the content of prior damage remains the same, while the hydrogen content, however, is reduced clearly.

It is therefore an object of the invention to increase and/or equalize the hydrogen content of the blanks to a minimum level. This is achieved by a subsequent annealing in an atmosphere of hydrogen. In other words, the object of the invention is

- to increase the hydrogen content in the blank, in order to reduce the LIA without changing the refractive index homogeneity and the stress birefringence in an impermissible manner and
- to change the hydrogen content in the blank, in order to improve the homogeneity of the refractive index, without changing the LIA and the stress birefringence impermissibly.

Pursuant to the invention, the objective, which is indicated above and shown in detail, is accomplished by the characterizing, distinguishing features of one aspect of the invention and defined more precisely by the characterizing features of the disclosure. Moreover, it should be noted that the conditions for absorbing hydrogen also depend on the viscosity of the quartz glass, measured in deci Pascal seconds (dPas), which, in turn, depends on the water content. A quartz glass object, produced according to the inventive method and having any disk shape in plan view, arises from the characterizing distinguishing features of other aspects of the invention.

The hydrogen distribution in blanks of quartz glass is changed by diffusion. At the same time, the hydrogen content in the bulk of the blank approaches that at the surface, until the two are equalized. During this equalization, the hydrogen distribution in the blank changes according to the physical laws of diffusion. For a given geometry and initial distribution of the hydrogen in the blank, the change in the hydrogen distribution in the blank can be controlled by a temporal change in the hydrogen content at the surface of the blank and by the temperature of the blank. This is accomplished by annealing the blank in a furnace at a specified furnace temperature and a specified chemical composition of the furnace atmosphere and a specified annealing time. The furnace atmosphere can be varied continuously from a hydrogen-free atmosphere (such as air) to a pure hydrogen atmosphere (hydrogen gas). The following parameters were ascertained experimentally for the diffusion of hydrogen in synthetic quartz glass with an average Si—OH content of 1100 to 1300 ppm (by weight):

Temperature-dependent diffusion constant $$D(T)=D_0 \exp(-E_a/(R \times T)) \, m^2/s \quad (1)$$

With:
$D_0 = 2 \times 10^{-7} \, m^2/s$,
$E_a = 42.7 \, kJ/mole$
R is the gas constant and
T is the absolute temperature The hydrogen concentration $CH_{ob}$ in the surface of the blank is calculated to be $$CH_{ob}=(F \times L \times P \times C_{hg})/R \times T \text{ molecules/cc} \quad (2)$$

in which
F is a solubility factor, which is determined experimentally to be=0.035
L is Avogadro's number
R is the gas constant
P is the furnace pressure
T is the absolute temperature and
$C_{hg}$ is the hydrogen concentration in the furnace atmosphere under normal conditions of temperature and pressure as a percentage.

In the above equation (2), the quantities P, $C_{hg}$ and T can be adjusted.

For the effect of the change in the hydrogen distribution on the change in the homogeneity of the refractive index, the following average relationship was determined experimentally:

$$\Delta n/\Delta CH=1.3 \, (ppm)/(10^{18} \text{ molecules/cc}) \quad (3)$$

in which
$\Delta n=(n(R)-n(0))$; difference between the refractive index of the center (0) and the edge (R) of the blank (ppm).
$\Delta CH=(CH(R)-CH(0))$; difference between the hydrogen content of the center (0) and the edge (R) of the blank ($10^{18}$ molecules/cc).

The absolute refractory index and the hydrogen content are proportional to one another, that is, an increase in the hydrogen content leads to an increase in the absolute refractive index.

The following average relationship was established experimentally for the effect of the change in the hydrogen distribution on the change in the stress birefringence:

$$\Delta SDB/\Delta CH=0.2 \, (nm/cm)/(10^{18} \text{ molecules/cc}) \quad (4)$$

wherein
$\Delta SDB=(SDB(R)-SDB(0))$; difference between the stress birefringence of the center (0) and the edge (R) of the blank (nm/cm).

The values measured for the stress birefringence and the water content are proportional; that is, an increase in the water content at one place in comparison to a reference place reads to an increase in the stress birefringence at this place in comparison to the reference place.

On the basis of the above mathematical relationships, the validity of which, with respect to the invention, was confirmed experimentally, the following can be stated. In order to increase the water content in a blank, so that the LIA is decreased without impermissibly changing the refractive index homogeneity and the stress birefringence, it is sufficient to adjust the hydrogen distribution in the blank, which reaches a specified minimum everywhere and is sufficiently equalized, so as not to affect the refractive index homogeneity and the stress birefringence impermissibly. In order to achieve this value in justifiable process times, the furnace temperature and the hydrogen pressure must be adjusted so that the hydrogen concentration at the edge of the blank, which is given above, is somewhat larger than the minimum value specified. The holding time for the annealing arises out of the blank geometry and the original hydrogen content in the blank, as well as from the diffusion constant according to the well-known differential equation for diffusion, which reads $$dC/dt = D \times \Delta C,$$

in which
C is the concentration of molecular hydrogen and
$\Delta$ is a Laplace operator.

In order to change the hydrogen content of a disk-shaped quartz glass object so that the homogeneity of the refractive index is improved without changing the LIA and the stress birefringence impermissibly, the following procedure is followed:

The refractive index distribution, the stress birefringence and the hydrogen distribution of the round disk are measured and the refractive index differences, which are to be equalized, are determined.

The local increase in hydrogen, required to equalize the refractive index, is determined by the calculation procedure described above for establishing the effect of hydrogen on the refractive index and on the stress birefringence.

The temperature for loading with hydrogen is selected, on the one hand, so high, that the process time still remains practical and, on the other, so that other, unwanted reactions (such as an increase in the stress birefringence) do not take place. Taking into consideration the viscosity of the quartz glass used, this annealing temperature can be between 573° K. and 1173° K. and preferably is at about 773° K. The viscosity is, for example, $10^{14.5}$ dPas, when the quartz glass contains approximately 1000 ppm of OH groups.

If the annealing temperature is fixed, the holding time or the annealing time and the hydrogen pressure in the furnace are determined so that, starting out from the initial concentration of hydrogen at the end of the annealing, the hydrogen distribution is as desired and the refractive index distribution is equalized sufficiently. The annealing time is between 10 hours and 730 hours, in which up to 10 hours can be included for heating and cooling of the quartz glass object. The hydrogen pressure P in the furnace is between 0 and 20 bar.

The hydrogen loading at the temperatures, given above, is limited owing to the fact that, if local differences in the hydrogen concentration are too high (more than $5 \times 10^{18}$ molecules/cc), the stress birefringence exceeds a permissible value. A further equalization of the refractive index is then no longer possible because of the excessive stress birefringence.

With that, there are optimum loading conditions for each starting disk for the best possible approach to the objective.

Disk-shaped quartz glass objects with diameters of 50 to 350 mm and thicknesses (heights) of 10 to 100 mm, which were annealed according to the inventive method, have a hydrogen concentration of $5 \times 10^{17}$ molecules/cc, a stress birefringence of less than 1 nm/cm and a refractive index homogeneity of $\leq 1$ ppm.

EXAMPLES

Example 1

A blank, in the form of a circular disk, has a diameter of 200 mm and a thickness of 50 mm. The (equalized) initial hydrogen content is $1 \times 10^{17}$ molecules/cc and is to be raised to $5 \times 10^{17}$ molecules/cc. This is achieved by the following steps:

Pure hydrogen gas is used as furnace atmosphere, that is, $C_{hg}=1$.

A temperature of 773° K. is selected as furnace temperature. The furnace temperature selected is clearly below the transformation temperature, so that new stresses are not formed.

The furnace pressure P for $CH_{ob}=6 \times 10^{17}$ molecules/cc is calculated from equation (2) and found to be 1.8 bar.

The annealing time sought is obtained taking into consideration the differential equation of the diffusion of hydrogen in quartz glass and noting the initial and boundary conditions given above. Linear heating and cooling times of the furnace of five hours each are included in the calculation. For this example, an annealing time of 730 hours results. The hydrogen distribution $H_m(r)$ is a value averaged over the thickness of the circular disk. In the center of the disk, it has a value of $5 \times 10^{17}$ molecules/cc and, at the edge of the disk, a larger value, namely $6 \times 10^{17}$ molecules/cc.

The result is shown in FIG. 1. The effect of the hydrogen increase, remaining there at the edge of the disk, on the homogeneity of the refractive index and on the stress birefringence can be calculated from the formulas above. In this example, it amounts to $\Delta N = 0.1 \times 1.3 = 0.13$ ppm $\Delta SDB = 0.1 \times 0.2 = 0.2$ nm/cm

Example 2

A disk-shaped quartz glass object with a diameter of 48 mm and a thickness of 30 mm has an absolute refractive index, which decreases towards the edge. This refractive index distribution is improved by annealing under the hydrogen in the sense of lowering the refractive index difference from the center to the edge. At the same time, the stress birefringence is reduced slightly.

Figure 2:
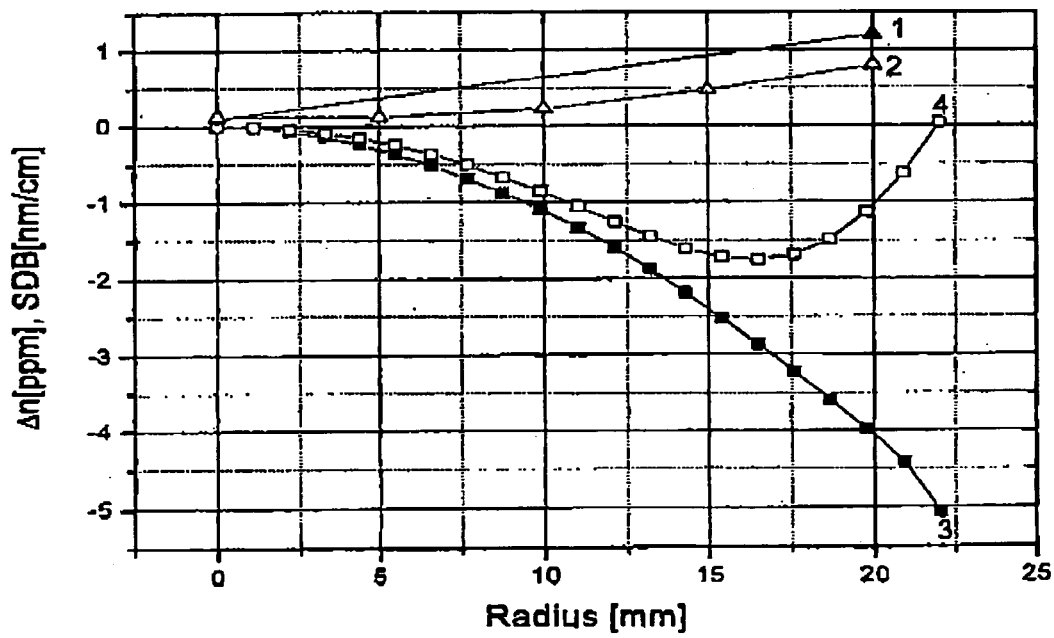

The homogeneity of the refractive index and the stress birefringence before and after the annealing are indicated by the curves 1, 2, 3, 4 in FIG. 2. The stress birefringence is improved slightly from about 1.2 nm/cm to 0.8 nm/cm. On the other hand, the homogeneity of the refractive index was reduced from $\Delta n=4$ ppm before the annealing to $\Delta n=1.8$ ppm after the annealing for a diameter of about 40 mm.

In the case of special, initial hydrogen profiles, it may be necessary to combine annealings under hydrogen and in air (that is, a hydrogen concentration of zero at the surface of the blank) in such a manner, that the desired property profiles are approached in the best possible way. The sequence of annealings and the process parameters, which are necessary for this, can be determined, for example, with the help of the equations given above.

This invention thus provides the possibility of ameliorating quality deficiencies of circular quartz glass disks by one or more subsequent process steps, so that these disks fulfill certain specifications.

The invention claimed is:

1. Method for loading a quartz glass object wit hydrogen in order to effect homogeneity of refractive index and increase laser resistance of said quartz glass object, and for maintaining a specified stress birefringence of said quartz glass object, said method comprising:

determining values of a plurality of process parameters relating to a process for annealing said quartz glass object in an annealing furnace to hydrogen-load said quartz glass object, said process parameters comprising: change in hydrogen loading of said quartz glass object required to effect homogeneity of the refractive index of said quartz glass object, annealing furnace temperature at which said quartz glass object is to be hydrogen-loaded, annealing time of said quartz glass object in said annealing furnace, hydrogen concentration in said annealing furnace, and hydrogen pressure in said annealing furnace; and annealing said quartz glass object in said annealing furnace under values of said plurality of determined process parameters, which are adjusted during said annealing in order to maintain an appropriate overall set of conditions necessary for sufficiently homogenizing the distribution of the refractive index in the quartz glass object.

2. The method of claim 1, wherein said process for annealing said quartz glass object in said annealing furnace is performed in an atmosphere comprising at least one of hydrogen, and air.

3. The method of claim 2, wherein said process for annealing said quartz glass object in said annealing furnace is performed in two stages, wherein in a first stage, said atmosphere is hydrogen, and wherein in a second stage, said atmosphere is air.

4. The method according to claim 1, wherein said annealing furnace temperature is a function of viscosity of said quartz glass object, and is 573° K. to 1173° K.

5. The method according to claim 4, wherein said temperature is 773° K.

6. The method according to claim 4, wherein said viscosity of said quartz glass object is greater than $10^{14.5}$ dPas.

7. The method according to claim 1, wherein said hydrogen pressure in said annealing furnace is greater than 0 bar and less than 20 bar.

8. The method according to claim 1, wherein said annealing time of said quartz glass object in said annealing furnace is 10 to 730 hours.

9. The method according to claim 8, wherein said annealing time further comprises a heat-up period and a cool-down period.

10. The method according to claim 9, wherein said hear-up period and said cool-down period total 10 hours.

11. The method according to claim 10, wherein said heat-up period and said cool-down period are each 5 hours.

12. The method according to claim 9, wherein said heat-up period is 5 hours, said annealing furnace temperature is 733 ° K., said annealing time is 730 hours, said cool-down period is 5 hours, and said hydrogen pressure In said annealing furnace is 1.8 bar.

* * * * *